March 14, 1939. E. EGER 2,150,648
INNER TUBE FOR PNEUMATIC TIRES
Filed July 12, 1935

INVENTOR.
ERNST EGER
BY
ATTORNEY

Patented Mar. 14, 1939

2,150,648

UNITED STATES PATENT OFFICE 2,150,648

INNER TUBE FOR PNEUMATIC TIRES

Ernst Eger, Grosse Pointe Park, Mich., assignor, by mesne assignments, to United States Rubber Company, New York, N. Y., a corporation of New Jersey Application July 12, 1935, Serial No. 30,978

1 Claim. (Cl. 152—349)

My invention relates to safety inner tubes used in pneumatic tires, particularly automobile tires. More particularly, the invention relates to inner tubes having a plurality of inflatable compartments.

Due to the present large cross sectional sizes of pneumatic tires and the increased speeds of automotive vehicles, considerable danger is involved due to the possibility of a tire becoming suddenly deflated. It is, therefore, an object of my invention to provide an improved construction in safety tubes wherein if one tube becomes deflated a second tube takes its place, thus preventing a sudden and total deflation of the fluid pressure carrying medium within the casing.

In the inner tube of my construction, the rim engaging or inner chamber is a complete unit having its outer peripheral surface less yieldable than its inner rim engaging surface; and the outer chamber is mounted over the crown portion of the inner chamber and is more yieldable than the inner chamber so that the stiffer wall of the inner chamber acts to control the distribution of fluid pressure between the chambers. Preferably, the yielding characteristics of the chambers are controlled by the thicknesses of the rubber used.

These and other objects and advantages appear more fully in the following detailed description when considered in connection with the accompanying drawing, in which.

Figure 1:
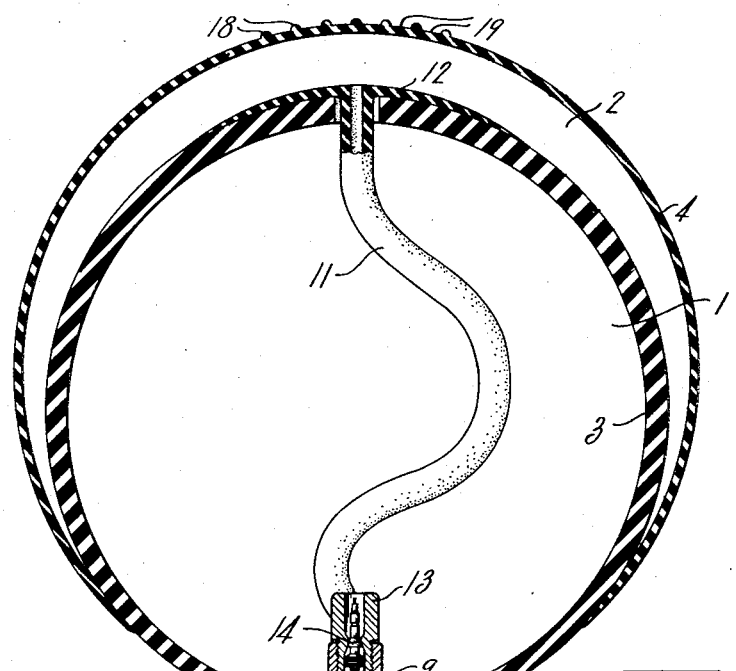
Fig. 1 is a transverse view in section of an inner tube embodying my invention.

Referring to Fig. 1, there is shown an embodiment of my invention in the form of a safety tube having independent air chambers 1 and 2. The inner chamber 1 is formed by an annular tube of rubber 3 somewhat similar to the conventional inner tube. The outer chamber 2 is formed in part by the outer periphery of the tube 3, and in part by a circumferential strip of rubber 4 extending around the tube 3 and attached thereto at seams near the rim portion of the tube. The strip of rubber 4 is secured to the tube 3 by a vulcanizing operation or by cementing the strip in place, as hereinafter described.

Associated with the tube 3 is a valve stem 5 which may be secured to the tube 3 by mechanical means such as a conventional all-metal valve stem, or by a part rubber assembly such as a pad 6, shown in the drawing.

My safety tube requires a special valve connection so that fluid under pressure may simultaneously pass into each of the chambers 1 and 2 through independent connections.

Figure 2:
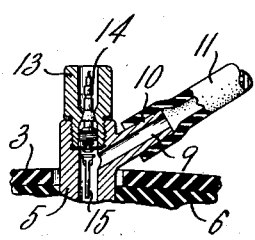
Fig. 2 is a transverse view in section of a portion of the valve mechanism.

Within the valve stem 5 is a conventional valve core 7. This core operates alone to seal the fluid pressure within the air chamber 2. In the initial inflation of the chamber 2, the fluid under pressure passes from a conventional air chuck (not shown) into an aperture 8 of the valve stem 5 and follows through an aperture 9 of an extension 10 of the valve stem 5. This is shown in detail in Fig. 2.

Associated with the extension 10 is a flexible hose 11 which connects the aperture 9 with the air chamber 2. A patch 12 forming a part of the rubber hose 11 is secured to the tube 3 at the crown portion of the outer periphery of the tube 3. Thus, a direct independent passageway is formed from the aperture 8 of the valve stem 5 to the chamber 2 through the chamber 1.

Within the chamber 1 and secured to the inner end of the valve stem 5 is a valve mechanism retainer 13 containing a valve core 14. This places the valve core 7 and the core 14 in direct axial alignment. A plunger pin 15 is disposed within the aperture 8 of the valve stem 5, and functions as an extension of the pin which forms a part of the valve core 7 so that actuation of the pin in the valve core 7 mechanically produces a corresponding actuation of the valve core 14. When the valve core 14 is open, a communication is formed between the aperture 8 within the valve stem 5 and the chamber 1.

From the foregoing it is apparent that the application of a conventional air chuck at the outer end of the valve stem 5 will function to introduce fluid under pressure into the aperture 8 through the valve core 14, and into the chamber 1; and, in addition, will permit a free flow of fluid under pressure from the aperture 8 through the aperture 9 and hose connection 11 into the chamber 2. Accordingly, by this form of valve mechanism the chambers 1 and 2 may be inflated simultaneously, while at the same time the fluid pressure is retained within the respective chambers by independent means. However, when it is desired to deflate the safety tube an operator may, by depressing the plunger in the valve core 7, also cause the plunger within the valve core 14 to be depressed, thus releasing the fluid pressure from the chambers 1 and 2 simultaneously.

In order to obtain the proper functioning of my safety tube I find it desirable to use differential thicknesses for the walls which form the chambers 1 and 2. For example, and not as a limitation of the invention, I find it preferable to maintain the thickness of the wall of the tube 3, particularly at the crown portion thereof, at a gauge of approximately .200 inch. However, the thickness of the wall of the tube 3 at the base or rim portion may be reduced to a gauge thickness of .125 inch. This reduction in the thickness of the wall at the base of the tube is preferable because the tube at this location will conform better to the profile of the rim; and upon inflation the beads of the tire will more quickly maintain their proper relation with the rim.

For reasons hereinafter explained, I prefer that the thickness of the strip of rubber 4 forming the outer wall of the chamber 2 have a gauge of approximately .065 inch.

Figure 3:
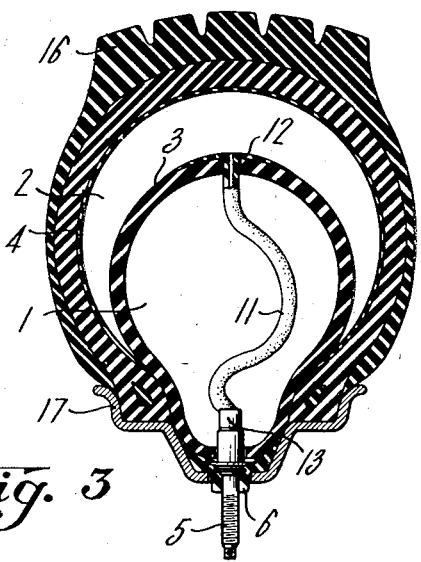
Fig. 3 is a transverse view, in section, of a tube of my invention, in normal operative assembly with a pneumatic tire and rim.

In Fig. 3, I show a safety tube embodying my invention in a state of inflation, and associated with a pneumatic tire 16 and rim 17. When my safety tube is mounted within the tire 16 and inflated, the fluid pressure passes into chambers 1 and 2 simultaneously. During this inflation process both chambers 1 and 2 directly communicate with the aperture 8 of the valve stem 5. Accordingly, any resistance by either of the chambers to the free flow of fluid pressure will operate to increase the flow of fluid pressure to the other chamber. At a definite stage in the flow of fluid pressure into the chambers 1 and 2, the wall of the tube 3, because of its thickness, will resist expansion until the thinner wall 4 of the chamber 2 has reached the point of inextensibility due to its confinement by the tire casing 16. Thereafter the tube 3 will remain in a neutral position such as shown in Fig. 3 by reason of the balanced fluid pressures within the respective chambers.

Figure 4:
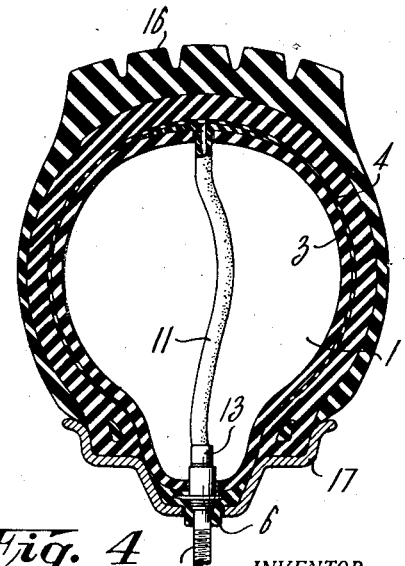
Fig. 4 is a similar view illustrating the outer chamber in deflated condition.

In Fig. 4, chamber 2 is shown in a deflated condition, as by being punctured or otherwise relieved of its fluid pressure retaining capacity. In such case the tube 3 expands and assumes a position occupying the entire area within the tire casing. It has been demonstrated that a fluid pressure of thirty-two pounds within the chambers 1 and 2 will, upon deflation of the chamber 2, result in a remaining pressure of nineteen pounds within the chamber 1. Such a reduction in pressure normally is not excessive to a point in which the tire casing will incur serious damage. In order to attain the advantages of my invention it is essential that the cross sectional area of the tube defined by the wall 3 should equal at least 50 per cent of the total cross sectional area of the combined chambers 1 and 2.

It is also understood that the cause which produces deflation of the chamber 2 may persist and also produce deflation of the chamber 1. The cause which produces deflation of the chamber 2 would not under ordinary circumstances operate instantly to produce deflation of the chamber 1. Thus, the operator of a vehicle having inner tubes of my embodiment would, after the first tube becomes deflated, become sufficiently apprised of the occurrence by reason of the swaying or riding quality of the vehicle due to this partial deflation. With this knowledge the operator may gradually bring the vehicle to a stop without endangering the stability of the vehicle, and without danger to the tire casing. It has also been found that the vehicle may be driven many miles after the partial deflation, without serious injury to the tire carcass as the tube 3 expands to fill the tire cavity, as shown in Fig. 4, thereby directly supporting the tire plies.

In some cases, where the secondary tube is not extensible, and does not fill the tire cavity, detrimental results follow when the secondary tube is in operation, by reason of the friction due to the difference between the circumferential length of the crown portion of the secondary tube, and the peripheral length of the interior of the tire at the crown thereof. My invention, therefore, is advantageous in that the secondary tube or tube 3 expands and functions as a conventional tube without friction between the outer periphery of the tube and its adjacent engaging surface of the tire. If desired, the rubber strip 4 may be provided with ribs 18 defining venting passageways 19 for engaging the inner peripheral wall of the tire 16.

The first step in the manufacture of my dual tube is the tubing of the inner inner-tube 3. This is accomplished in the usual manner; that is, the ends of the tube are buffed and spliced together to form an annular member. A hole is cut in the top of the tube opposite the valve mechanism, and the hose 11 and pad 12 forming an integral part thereof, is assembled with the tube. Usually a buffing on the tube in the area of the pad is required before the pad is stitched in position on the tube. The opposite end of the hose 11 is closed temporarily such as by pressing a wooden pin into the open aperture. Next a temporary valve stem, such as an ordinary bicycle valve stem, is applied to the valve region of the inner tube 3. In this condition the inner tube 3 is placed in a heater and vulcanized. During vulcanization the hose 11 performs no operation, but merely hangs loosely within the inner tube 3.

The wall of the outer chamber 2 is originally tubed in the form of a continuous strip of tubing. A measured length of this tubing is slit longitudinally and its ends are spliced together to form, in effect, a band. The vulcanized inner tube 3 is buffed on its outer periphery in a circumferential path at which it is intended to secure the ends of the band of rubber 4. A coating of cement is applied on the circumferential, buffed path and allowed to dry, after which the ends of the strip of rubber are stitched along a definitely marked location.

Before the strip of rubber 4 is secured to the inner tube, the contacting area of the strip of rubber 4 is also buffed. At this step of the manufacture of the tube the temporary bicycle valve stem previously vulcanized to the inner tube is cut away from the tube 3, and the valve stem region is buffed and cemented. The hose 11 is partially withdrawn from within the inner tube 3 through the valve stem aperture, the wooden pin is removed, and the hose is attached to a completely assembled valve mechanism. The pad 6 attached to the valve stem is stitched in place on to the inner tube 3, and the entire assembly is again placed in a heater of larger dimensions and vulcanized.

During the second vulcanizing operation the inner tube 3 expands to a point of equilibrium, while the outer wall 4 conforms to the profile of the mold. By this method the inner tube is subjected to a double vulcanizing operation, which apparently results in no ill effect.

While I have shown and described a present preferred form of the invention, it is to be understood that the invention may be otherwise embodied within the spirit of the invention and the scope of the appended claim.

Having thus described my invention what I claim and desire to protect by Letters Patent is:

A multi-chamber inner tube comprising a rubber inner tube the wall thickness of which increases progressively outwardly from its inner periphery towards its outer periphery, an outer rubber envelope attached only at its edges to the side walls of the inner tube and above the rim engaging portion of the tube to form a second air chamber, the rubber of the envelope being more yielding than the rubber of the enclosed portion of the inner tube whereby the envelope expands under internal pressure more readily than the inner tube, and means for simultaneously inflating said tube and chamber with fluid from a common source to obtain a balanced pressure therein.

ERNST EGER.